(12) United States Patent
Tzabary et al.

(10) Patent No.: US 12,537,849 B1
(45) Date of Patent: Jan. 27, 2026

(54) TECHNIQUES FOR API ENDPOINT MITIGATION

(71) Applicant: Wiz, Inc., New York, NY (US)

(72) Inventors: Or Tzabary, Petah Tikva (IL); Ido Yariv, New York, NY (US); Cfir Cohen, Seattle, WA (US)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/092,750

(22) Filed: Mar. 27, 2025

(51) Int. Cl.
*H04L 9/40* (2022.01)
*G06F 9/54* (2006.01)

(52) U.S. Cl.
CPC .......... *H04L 63/1441* (2013.01); *G06F 9/547* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 10,063,570 B2 | 8/2018 | Muddu et al. | |
| 10,917,439 B2 | 2/2021 | Purathepparambil et al. | |
| 11,388,186 B2 | 7/2022 | Srivastava | |
| 11,477,219 B2 | 10/2022 | Jenkinson et al. | |
| 11,863,573 B2 | 1/2024 | Tineo | |
| 2018/0255089 A1* | 9/2018 | Wilton | H04L 63/1433 |
| 2021/0352136 A1* | 11/2021 | Dojka | H04L 67/34 |
| 2021/0382986 A1* | 12/2021 | Lebin | H04L 67/133 |
| 2023/0019180 A1 | 1/2023 | de Nijs et al. | |
| 2024/0176892 A1* | 5/2024 | Mehta | G06F 21/629 |
| 2024/0275808 A1* | 8/2024 | Lejin | H04L 63/02 |
| 2024/0403437 A1* | 12/2024 | Szigeti | G06F 21/577 |
| 2024/0403444 A1* | 12/2024 | Jeevagunta | G06F 21/577 |
| 2024/0406201 A1* | 12/2024 | Khayat | G06F 9/547 |

* cited by examiner

*Primary Examiner* — Joseph P Hirl
*Assistant Examiner* — Hassan Saadoun
(74) *Attorney, Agent, or Firm* — M&B IP Analysts, LLC

(57) ABSTRACT

A system and method for initiating a mitigation action for an exposed Application Programming Interface (API) endpoint in a cloud computing environment is presented. The method includes detecting an API endpoint of a plurality of API endpoints in a cloud computing environment; executing a network access instruction on the API endpoint, wherein the network access instruction is provided over at least an external network; determining that the API endpoint is an exposed API endpoint in response to receiving a predetermined result of executing the network access instruction; initiating a mitigation action in response to the detection of the exposed API endpoint.

21 Claims, 6 Drawing Sheets

TECHNIQUES FOR API ENDPOINT MITIGATION

TECHNICAL FIELD

The present disclosure relates generally to the field of cybersecurity threat detection and specifically to the detection of exposed Application Programming Interface (API) endpoints that may indicate a potential security threat, vulnerability, and data breach.

BACKGROUND

An API is a mechanism that enables two software components to communicate with each other using a set of definitions and protocols. There are multiple types of APIs such as a Simple Object Access Protocol (SOAP) API, a Remote Procedure Call (RPC) API, a Websocket API, and a Representational State Transfer (REST) API.

API endpoints are final touchpoints in the API communication system. These include server Uniform Resource Locators (URLs), services, and other digital locations from where the information is sent and received between systems. API endpoints are specific URLs where a client can access an API. API endpoints serve as an authorized entryway that enables applications to interact with services, retrieve data, and perform various functions.

Since these API endpoints expose sensitive information and allow access to critical systems, they are prone to cybersecurity attacks. Thus, API endpoint security is essential to protect sensitive data, prevent data leaks, prevent unauthorized network access, prevent data manipulation, and misuse.

Challenges in the field of endpoint security include the lack of visibility in detecting endpoints. Reasons for the lack of visibility in detecting endpoints are that endpoints are not static and change dynamically. Furthermore, the use of API gateways and proxies obstruct endpoint detection by acting as the front interface for network traffic. Further, API gateways route the network traffic to different backend services, hiding the actual API endpoints from external view.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include detecting an API endpoint of a plurality of API endpoints in a cloud computing environment. The method may also include executing a network access instruction on the API endpoint, where the network access instruction is provided over at least an external network. The method may furthermore include determining that the API endpoint is an exposed API endpoint in response to receiving a predetermined result of executing the network access instruction. The method may in addition include initiating a mitigation action in response to the detection of the exposed API endpoint. Other embodiments of this aspect include corresponding computer systems, apparatus, and computer programs recorded on one or more computer storage devices, each configured to perform the actions of the methods.

Implementations may include one or more of the following features. The method may include: initiating the mitigation action in any of a plurality of platforms of the cloud computing environment. The method where the plurality of platforms includes any one of: an infrastructure as a service (IaaS), a platform as a service (PaaS), a software as a service (Saas), and any combination thereof. The method where initiating a mitigation action further may include: initiating any one of: an input validation, an authentication protocol, an API gateway, an API input rate limit, and any combination thereof. The method may include: determining that the API endpoint is an unexposed API endpoint in response to receiving a result of executing the network access instruction which is different than the predetermined result. The method where detecting an API endpoint further may include: receiving runtime data from a plurality of sensors, each sensor deployed on a workload in the cloud computing environment; extracting a plurality of API calls from the received runtime data; and detecting an API path from an extracted API call of the plurality of API calls. The method may include: initiating inspection of a workload associated with the API path; and detecting an API endpoint of the plurality of API endpoints based on a result of the inspection and the detected API path. The method may include: inspecting the workload for a cybersecurity object, where the cybersecurity object indicates an application associated with the API path. The method where initiating inspection of a workload may include: initiating static analysis on a workload on which a sensor is deployed for a detection of an application related to the API call. The method where verifying the API endpoint further may include: generating the network access instruction based on data extracted from an API call. The method where verifying the API endpoint further may include: generating a list of detected API endpoints based on runtime data and static analysis results of an application. Implementations of the described techniques may include hardware, a method or process, or a computer tangible medium.

In one general aspect, a non-transitory computer-readable medium may include one or more instructions that, when executed by one or more processors of a device, cause the device to: detect an API endpoint of a plurality of API endpoints in a cloud computing environment; execute a network access instruction on the API endpoint, where the network access instruction is provided over at least an external network; determine that the API endpoint is an exposed API endpoint in response to receiving a predetermined result of executing the network access instruction; initiate a mitigation action in response to the detection of the exposed API endpoint. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect an API endpoint of a plurality of API endpoints in a cloud computing environment. The system may in addition execute a network access instruction on the API endpoint, where the network access instruction is provided over at least an external network. The system may moreover determine that the API endpoint is an exposed API endpoint in response to receiving a predetermined result of executing the network access instruction. The system may also initiate a mitigation action in response to the detection of the exposed API endpoint. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: initiate the mitigation action in any of a plurality of platforms of the cloud computing environment. The system where the plurality of platforms includes any one of: an infrastructure as a service (IaaS), a platform as a service (PaaS), a software as a service (Saas), and any combination thereof. The system where the memory contains further instructions that, when executed by the processing circuitry for initiating a mitigation action, further configure the system to: initiate any one of: an input validation, an authentication protocol, an API gateway, an API input rate limit, and any combination thereof. The system where the memory contains further instructions which when executed by the processing circuitry further configure the system to: determine that the API endpoint is an unexposed API endpoint in response to receiving a result of executing the network access instruction which is different than the predetermined result. The system where the memory contains further instructions that, when executed by the processing circuitry for detecting an API endpoint, further configure the system to: receive runtime data from a plurality of sensors, each sensor deployed on a workload in the cloud computing environment; extract a plurality of API calls from the received runtime data; and detect an API path from an extracted API call of the plurality of API calls. The system where the memory contains further instructions which when executed by the processing circuitry further configure the system to: initiate inspection of a workload associated with the API path; and detect an API endpoint of the plurality of API endpoints based on a result of the inspection and the detected API path. The system where the memory contains further instructions which when executed by the processing circuitry further configure the system to: inspect the workload for a cybersecurity object, where the cybersecurity object indicates an application associated with the API path. The system where the memory contains further instructions that, when executed by the processing circuitry for initiating inspection of a workload, further configure the system to: initiate static analysis on a workload on which a sensor is deployed for a detection of an application related to the API call. The system where the memory contains further instructions that, when executed by the processing circuitry for verifying the API endpoint, further configure the system to: generate the network access instruction based on data extracted from an API call. The system where the memory contains further instructions that, when executed by the processing circuitry for verifying the API endpoint, further configure the system to: generate a list of detected API endpoints based on runtime data and static analysis results of an application. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
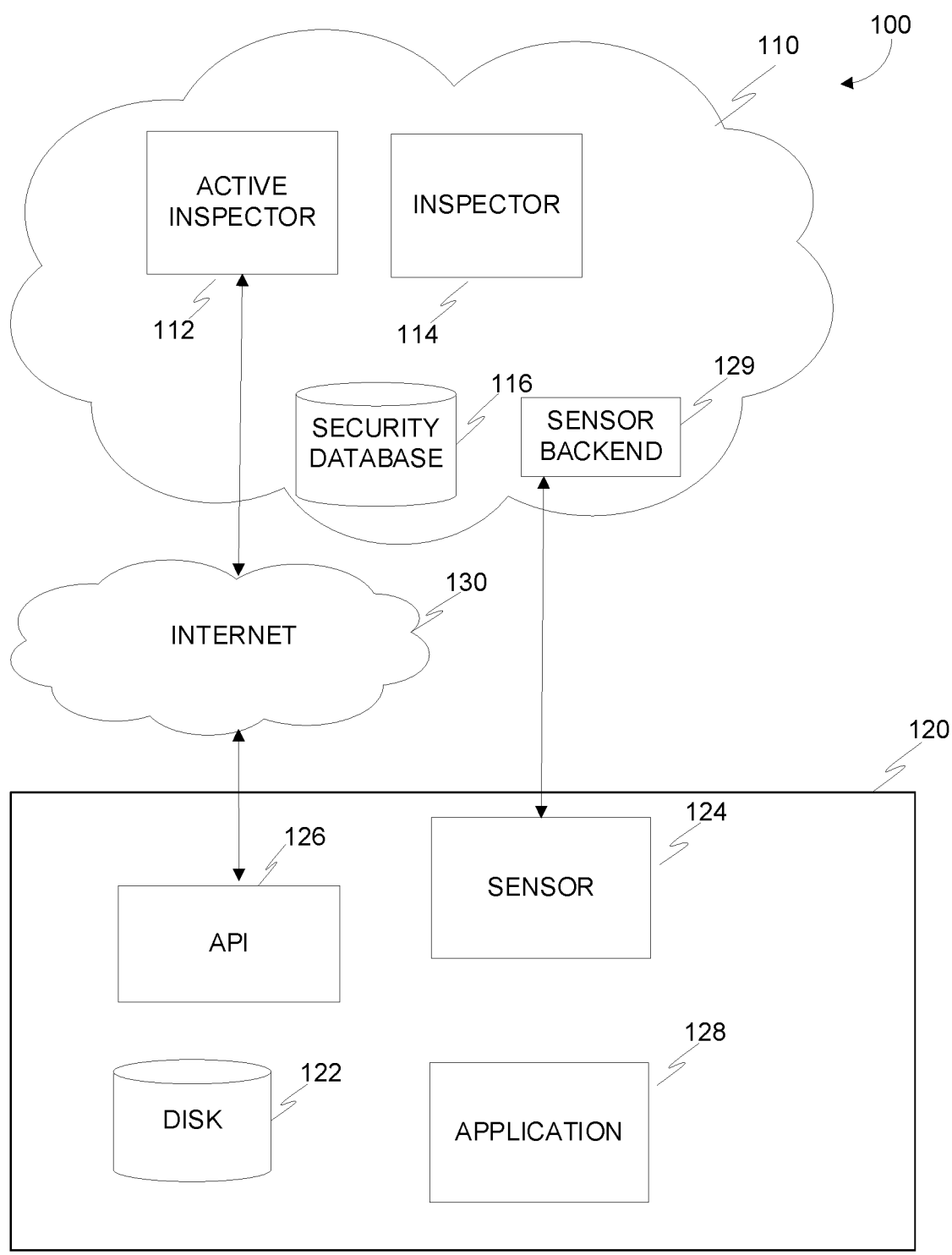
FIG. 1 is an example schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for API endpoint detection in a cloud computing environment. The disclosed embodiments provide for the detection of API endpoints based on detecting an API path from an API call and initiating inspection of a corresponding workload. It is advantageous to detect an API endpoint based on the detection of an API path from runtime data generated from a sensor and workload inspection, as this provides for a more precise and accurate detection of an actual endpoint. Further, it is advantageous to accurately detect endpoints as they provide valuable insight for the detection and prevention of potential cybersecurity threats, vulnerabilities, data breaches, and the like.

FIG. 1 is an example schematic diagram 100 of a cloud computing environment monitored for a cybersecurity threat by an inspection environment 110, implemented in accordance with an embodiment. In an embodiment, a cloud computing environment is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

A cloud computing environment includes a workload 120. In various embodiments, a workload 120 includes cloud entities deployed as a component of the workload 120. In an embodiment, a cloud entity is a principal, a resource, a combination thereof, and the like. In an embodiment, a resource is a cloud entity which provides access to a compute resource, such as a processor, a memory, a storage, and the like. In some embodiments, a resource is a virtual machine, a software container, a serverless function, a server, and the like. In an embodiment, a resource is a software application, such as a web server, a gateway, a load balancer, a web application firewall (WAF), an appliance, and the like.

In certain embodiments, the workload 120 includes an Application Programming Interface (API) 126, a disk 122, a sensor 124, an application 128 (e.g., software application), a combination thereof, and the like. In various embodiments, an API 126 is configured to enable multiple systems, components (e.g., software components), principals, cloud entities, resources, hardware components, and the like, to communicate with an application 128 using a set of definitions, protocols, rules, policies, and the like.

In some embodiments, the API 126, a workload (e.g., server) hosting the API 126, and a combination thereof, is configured to receive an API call from a system, resource, component, application 128, a combination thereof, and the like, of the cloud computing environment. In an embodiment, an API call is a request from an application, client, component, system, and the like, through the API 126 to retrieve data, or perform a specific function. In some embodiments, an API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like.

For example, in an embodiment, the workload 120 (e.g., server hosting the API) is configured to receive the API call "/users/123" which is requesting information about a specific user. In various embodiments, the workload 120 is configured to validate the API call, execute computer instructions for the request, and return an API call response. For example, in an embodiment, the workload 120 is configured to query a database through an application 128 for user information, and the workload 120 is configured to return an API call response for information on a specific user from the application 128 in JavaScript Object Notation (JSON) format.

In an embodiment, an API call response, includes an HTTP status code, a header (e.g., metadata about the API response), a response body, a combination thereof, and the like. In various embodiments, an API call response is structured in a standard format such as JSON, Extensible Markup Language (XML), or plain text.

In some embodiments, the sensor 124 is implemented as an Extended Berkeley Packet Filter (eBPF) sensor, a runtime sensor, and the like. In some embodiments, the sensor 124 is implemented as an eBPF sensor which is configured to listen for events in the workload 120 environment utilizing an eBPF interface. In some embodiments, the sensor 124 is configured to monitor network interaction, including the interaction between the API 126 and the application 128.

In various embodiments, the sensor 124 is configured to collect data, such as runtime data, and the like, generated from the interactions, communications, and the like between the application 128 and the API 126. In an embodiment, for example, the sensor 124 is configured to collect runtime data including data of API calls, API call responses, events, runtime events, a combination thereof, and the like.

In an embodiment, an event is an occurrence, action, and the like, in a computing environment that results in unauthorized access to, disruption of, misuse of, a combination thereof and the like, a cloud computing environment. For example, in an embodiment, an event is an unsuccessful use login attempt, deletion of a file, unusual network communication, system modifications, notifications of security alerts, a combination thereof, and the like.

According to an embodiment, the sensor backend 129 is a workload, such as a virtual machine, software container, serverless function, a combination thereof, and the like, which is deployed in the inspection environment 110. In certain embodiments, the sensor 124 is further configured to send data (e.g., runtime data) to the sensor backend 129. In some embodiments, the sensor 124 is configured to detect events and send a detection notification to the sensor backend 129. In an embodiment, the detection notification includes an indicator of an event, without including the event itself.

In an embodiment, the sensor backend 129 is configured to receive runtime data, sensor data, detections, and the like, from the sensor 124. In an embodiment, the sensor backend 129 is configured to receive runtime data including data of API calls, API call responses, events, runtime events, a combination thereof, and the like. In an embodiment, the sensor backend 129 is configured to receive data (e.g., runtime data), which is generated from the application 128, the API 126, a client, the communication between the application 128 and the API, a combination thereof, and the like.

In an embodiment, the workload 120 further includes a disk 122. In various embodiments, the disk 122 is a storage device, such as a virtual disk, hard disk drive (HDD), a solid-state drive (SSD), and the like. In some embodiments, the disk 122 is configured to store applications 128, application data, software files, application states, and the like. In an embodiment, the disk 122 is an inspectable disk. In various embodiments, the disk 122 and all of its stored contents are accessible by the inspector 114.

In some embodiments, the inspection environment 110 includes an inspector 114, an active inspector 112, a security database 116, a sensor backend 129, a combination thereof, and the like. In various embodiments, the inspector 114 is configured to access the applications 128, software code, code objects, software data, software files, binaries, libraries, software images, and the like, from the disk 122. In some embodiments, the inspector 114 is configured to initiate static analysis on the software applications, code objects, software data, software files, and the like, stored on the disk 122. In an embodiment, the inspector 114 is configured to inspect for a cybersecurity object. A cybersecurity object may be, for example, a password, a certificate, a cryptographic key, a software, an application, a library, a binary, a configuration file, a filesystem, a combination thereof, and the like.

In certain embodiments, the inspection environment 110 further includes an active inspector 112. In an embodiment, the active inspector 112 is configured to initiate active inspection of a resource, such as workload 120, in a cloud computing environment. In some embodiments, the active inspector 112 is configured to initiate active inspection over a public network, external network, and the like, such as the Internet 130.

In some embodiments, the active inspector 112 is configured to generate a network access instruction. In an embodiment, a network access instruction includes a set of parameters, protocols, rules, and the like, for triggering an API call. In an embodiment, the active inspector 112 is configured to generate a network access instruction which is a request for access to a resource in the cloud computing environment from the API.

In an embodiment, a network access instruction is generated based on a predetermined structure of an API request. For example, in an embodiment, a network access instruction is generated based on parameters of an API call such as an HTTP protocol, a header, query parameters, an API key, authentication details, payload requests, a combination thereof, and the like. In an embodiment, an active inspector 112 is configured to execute a network access instruction on an API endpoint. In various embodiments, the active inspector 112 is configured to execute a network access instruction on an API endpoint to verify the API endpoint.

In various embodiments, the security database 116 is configured to store a representation of a cloud computing environment, such as a workload 120. In an embodiment, the security database includes a plurality of databases. In certain embodiments, the security database 116 is implemented as a graph database, tabular database, and the like. In various embodiments, the security database 116 is configured to store representations of entities, objects, resources, systems, and the like, of a cloud computing environment. In an embodiment, the representation includes a visual depiction, numerical values, binary values, nodes, edges, a combination thereof, and the like.

In some embodiments, the security database 116 is configured to store interactions between the entities and objects of the cloud computing environment. In an embodiment, the security database 116 is configured to store a log of API calls, API responses, API interactions with other entities, API communication with other entities, and the like. In an embodiment, the security database 116 is configured to store sensor data, runtime data, and the like, generated from the sensor 124. In an embodiment, runtime data includes data of API calls, API call responses, events, runtime events, a combination thereof, and the like.

Figure 2A:
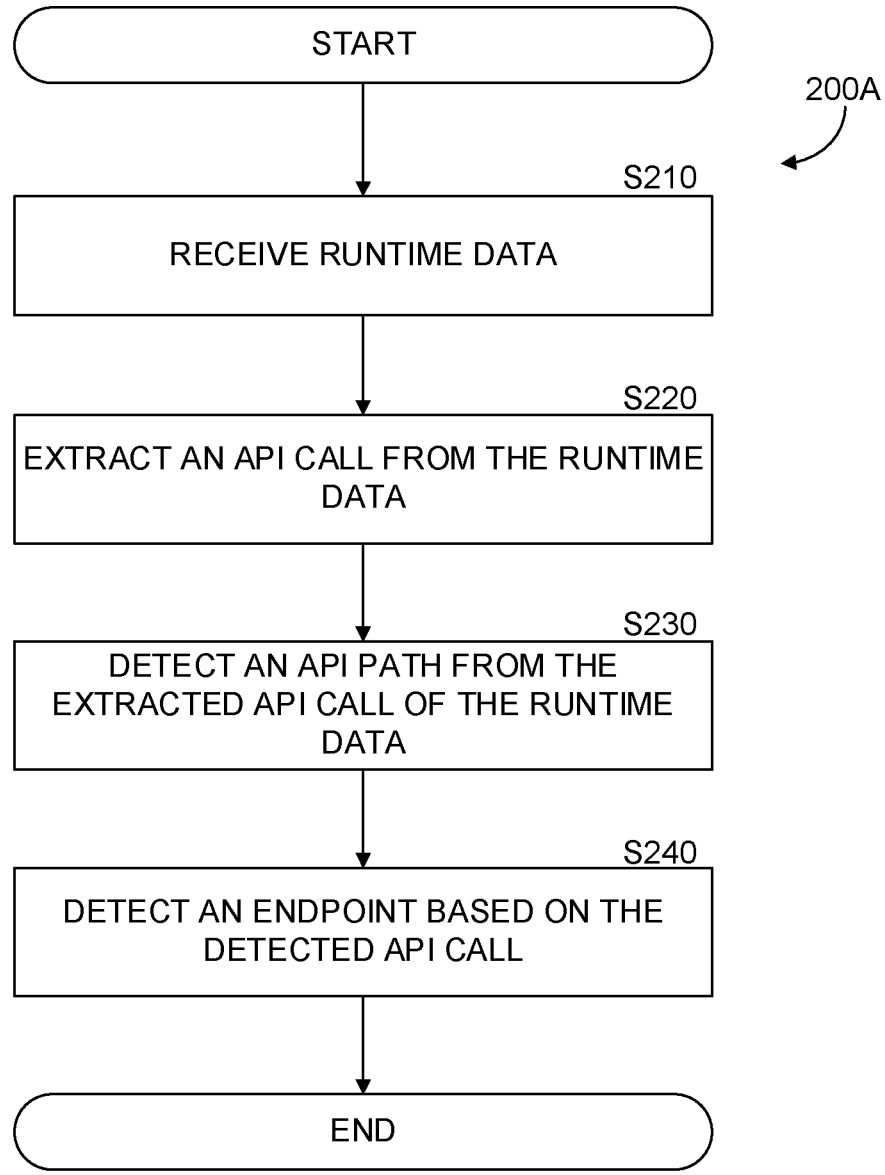
FIG. 2A is an example flowchart of a method for detecting an API endpoint, implemented in accordance with an embodiment.

FIG. 2A is an example flowchart 200A of a method for detecting an API endpoint, implemented in accordance with an embodiment. It is advantageous, to detect an API endpoint based further on runtime data detected by a sensor and inspection of a workload on which the sensor is deployed, as this provides for a more precise and accurate detection of an actual endpoint. In an embodiment, an API endpoint is a digital location where an API receives API calls for resources of the computing environment. Further, it is advantageous to detect endpoints as they provide valuable insight into potential cybersecurity threats, vulnerabilities, data breaches, and the like.

At S210, runtime data is received. In an embodiment, runtime data is detected by the sensor (e.g., sensor 124). In an embodiment, the sensor is deployed on a resource, workload, and the like, which itself is deployed in a cloud computing environment. In various embodiments, the sensor is implemented as an eBPF sensor, a runtime sensor, and the like. In some embodiments, an eBPF sensor is configured listen for events in the workload (e.g., workload 120) environment utilizing an eBPF interface.

In some embodiments, the sensor is configured to monitor network traffic, monitor network behavior, track system behaviors of the workload, a combination thereof, and the like. In an embodiment, the sensor is configured to monitor the interaction between an API (e.g., API 126) and the application. In various embodiments, the sensor is configured to detect runtime data generated from monitoring the interactions, communications, and the like, between an application and the API.

In an embodiment, for example, the sensor is configured to collect runtime data including data of API call requests, API call responses, events, runtime events, a combination thereof, and the like. According to an embodiment, runtime data is information generated, accessed, or manipulated by a program while it is actively running. In an embodiment, runtime data includes variables, system states, user inputs, logs, temporary data, and other dynamic information needed for a program's operation. Unlike static data, runtime data exists only during the execution period and is typically stored in a memory or other fast access storage medium, in an embodiment.

In some embodiments, the sensor is configured to merge runtime data into merged runtime execution data records, and send such records over a network interface to a sensor backend. In certain embodiments, the sensor includes detection rules which are applied to events on a workload to detect thereon API call requests, security risks, sensitive data, a combination thereof, and the like. According to an embodiment, such runtime events are sent from a sensor and received by a sensor backend server.

At S220, an API call request is extracted from the runtime data. In various embodiments, at least an API call request is extracted from runtime data based on reading data packets of the runtime data to identify API call requests, API data, API responses, a combination thereof, and the like. In some embodiments, API call data includes data of parameters such as an API path, an HTTP method (e.g., GET, POST, PUT, PATCH, etc.), a Uniform Resource Locator (URL) endpoint, a request header, a request body, a combination thereof, and the like.

In some embodiments, API call data is extracted from the runtime data. In an embodiment, an API endpoint is a dedicated URL that provides access to a specific resource, location, and the like, in the cloud computing environment. For example, in an embodiment, an API endpoint includes "https://api.example.com/user/321".

In an embodiment, an API path is a portion of an API endpoint that defines the resource, action, command, and the like, being requested from the server. For example, in an embodiment, an API path includes "user/321", which refers to a specific user identifier.

In an embodiment, a request type includes a Hypertext Transfer Protocol (HTTP) method which is a command (e.g., GET, POST, PUT, DELETE, etc.) used to indicate the desired operation of a resource for the API. For example, in an embodiment a request type of "GET myData" indicates the API call request of retrieving a specific data from a particular resource in the cloud computing environment.

In various embodiments, a request header of an API call request contains metadata in the format of key-value pairs. For example, in an embodiment a request header includes "Content-Type: application/json" which indicates that the request body of the API call contains an application in standardized JSON format. In some embodiments, a request body of an API call request includes the portion of the API call request carrying essential data required for the completion of the API call request. For example, in an embodiment, for an API call request of creating a new user account, the request body includes data such as a user identifier, a user email address, a user name, a password, a combination thereof, and the like.

At S230, an API path is detected. In an embodiment, the API path is detected from the extracted API call of the runtime data. In an embodiment, an API path is a portion of the API call that defines the resource or action being requested from the server. In various embodiments, extracted API calls are identified and parsed to detect distinct parameters of the API call. In some embodiments, inspection of a workload associated with the detected API path is initiated.

In an embodiment, an API path, an API endpoint, an API call request type, and the like, is detected from an API call. For example, in an embodiment, an API path of "/applications.name/" indicating a call request for accessing a specific application, is detected from an API call. In an embodiment, for example, an API path of "users/24", indicating a call request of providing access for a user identifier, is detected from an API call.

At S240, an API endpoint is detected. In some embodiments, an endpoint is detected based on the detected API path and the result of static analysis (discussed in more detail below). In an embodiment, an API path is detected from an extracted API call from runtime data. In some embodiments, the detected API path is associated with the results of static analysis to detect a specific API endpoint.

According to an embodiment, a network path is detected between the workload and an external network. In an embodiment, the external network is a network which is not part of the computing environment in which the workload is deployed. In an embodiment, the network path includes a URL. In some embodiments, the network path includes a list of identifiers of resources, such as a gateway, a load balancer, a web server, and the like, which are part of a network path between the external network and the workload.

In certain embodiments, the network path is detected based on analysis of a security database which includes a representation of the computing environment. In an embodiment, resources are represented in the security database and a path between the resources is detected by traversing a graph which is stored in the security database, wherein the graph includes representations of the resources and of connections between the resources.

In an embodiment, analysis is conducted on an application to obtain API call data including an API path, a request type (e.g., GET, POST, PUT, PATCH, etc.), a Uniform Resource Locator (URL) endpoint, a request header, a request body, a combination thereof, and the like, of the API call.

In an embodiment, a signature extracted from runtime data is compared to the a software function's signature generated from static analysis to detect an endpoint associated with the API path. In various embodiments, the detected endpoints are collected, compiled (e.g., compiled into a list), and stored in a disk, database, security database, a combination thereof, and the like.

In an embodiment, an API endpoint includes a resource locator and an API call. In certain embodiments, a plurality of API endpoints are detected for a particular resource. For example, in some embodiments, a plurality of API calls are detected in runtime data of a resource, each corresponding to a unique API endpoint. In certain embodiments, where an application is detected, additional API endpoints are generated based on at least an API call which is predetermined to be associated with the application. This may be performed despite not detecting the at least an API call in the runtime data.

Figure 2B:
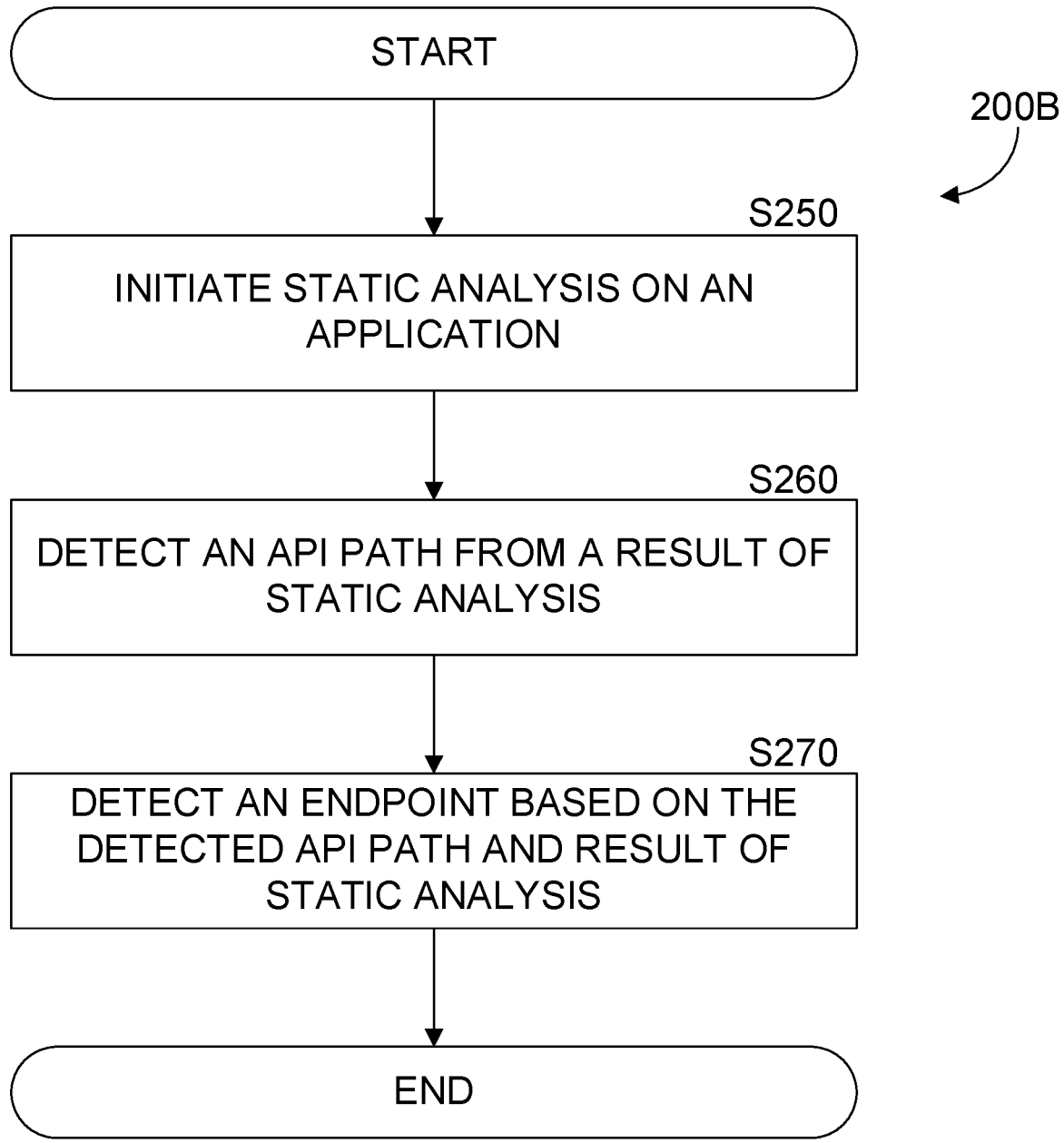
FIG. 2B is an example flowchart of a method for detecting an API endpoint utilizing static analysis, implemented in accordance with an embodiment.

FIG. 2B is an example flowchart 200B of a method for detecting an API endpoint utilizing static analysis, implemented in accordance with an embodiment. It is advantageous, to detect an API endpoint based further on static analysis based on inspection of a workload, as this provides for a more precise and accurate detection of an actual endpoint. In an embodiment, an API endpoint is a digital location where an API receives API calls for resources of the computing environment. Further, it is advantageous to detect endpoints as they provide valuable insight.

At S250 static analysis is initiated. According to an embodiment, an application identifier is detected in runtime data, in an API call, and the like. In some embodiments, inspection, static analysis, etc., is initiated on a workload on which the sensor is deployed to detect the application related to the API call. For example, an API call, an API call type, a regex of an API, etc., may be pre-associated with certain software applications, binaries, libraries, and the like, and inspection is initiated for such software applications that correspond to identifiers, indicators, etc., which are detected in the API call.

In various embodiments, an application (e.g., application 128) is a load balancer, a proxy server, a web server, a software application, a code object, a combination thereof, and the like. In some embodiments, the application is configured to generate an API call. In various embodiments, static analysis is initiated on the application to determine the configuration, functionalities, a combination thereof, and the like, of the application.

In some embodiments, static analysis is conducted by analyzing the code, software code, functions, calls, variables, and the like, of the application without fully executing it. In various embodiments, static analysis is conducted on the application to inspect software code that constructs an API call. In some embodiments, static analysis is conducted on the application, code, code objects, and the like, to obtain data from an API call including the API endpoint, API path, request type, request header, request body, a combination thereof, and the like.

In an embodiment, static analysis is initiated on a code object which is utilized to deploy an application. For example, static analysis may be initiated on a software package installer, on the software thereon, and the like, to detect various applications, detect configuration of such applications, and the like.

At S260, an API path is detected. In an embodiment, the API path is detected from an extracted API call from a result of static analysis of a code object, a software image, and the like. In an embodiment, an API path is a portion of the API call that defines the resource or action being requested from the server. In various embodiments, extracted API calls are identified and parsed to detect distinct parameters of the API call. In some embodiments, inspection of a workload associated with the detected API path is initiated.

In an embodiment, an API path, an API endpoint, an API call request type, and the like, is detected from an API call request. For example, in an embodiment, an API path of "/applications.name/" indicating a call request for accessing a specific application, is detected from an API call. In an embodiment, for example, an API path of "users/24", indicating a call request of providing access for a user identifier, is detected from an API call.

At S270, an API endpoint is detected. In some embodiments, an endpoint is detected based on the detected API path and the result of static analysis. In an embodiment, an API path is detected based on both an extracted API call from runtime data and a result of static analysis. In some embodiments, the detected API path is associated with the results of static analysis to detect a specific API endpoint.

According to an embodiment, a network path is detected between the workload and an external network. In an embodiment, the external network is a network which is not part of the computing environment in which the workload is deployed. In an embodiment, the network path includes a URL. In some embodiments, the network path includes a list of identifiers of resources, such as a gateway, a load balancer, a web server, and the like, which are part of a network path between the external network and the workload.

In certain embodiments, the network path is detected based on analysis of a security database which includes a representation of the computing environment. In an embodiment, resources are represented in the security database and a path between the resources is detected by traversing a graph which is stored in the security database, wherein the graph includes representations of the resources and of connections between the resources.

In an embodiment, analysis is conducted on an application to obtain API call data including an API path, a request type (e.g., GET, POST, PUT, PATCH, etc.), a Uniform Resource Locator (URL) endpoint, a request header, a request body, a combination thereof, and the like, of the API call.

In an embodiment, a signature extracted from runtime data is compared to a software function's signature generated from static analysis to detect an endpoint associated with the API path. In various embodiments, the detected endpoints are collected, compiled (e.g., compiled into a list), and stored in a disk, database, security database, a combination thereof, and the like.

In an embodiment, an API endpoint includes a resource locator and an API call. In certain embodiments, a plurality of API endpoints are detected for a particular resource. For example, in some embodiments, a plurality of API calls are detected in runtime data of a resource, each corresponding to a unique API endpoint. In certain embodiments, where an application is detected, additional API endpoints are generated based on at least an API call which is predetermined to be associated with the application. This may be performed despite not detecting the at least an API call in the runtime data.

Figure 3:
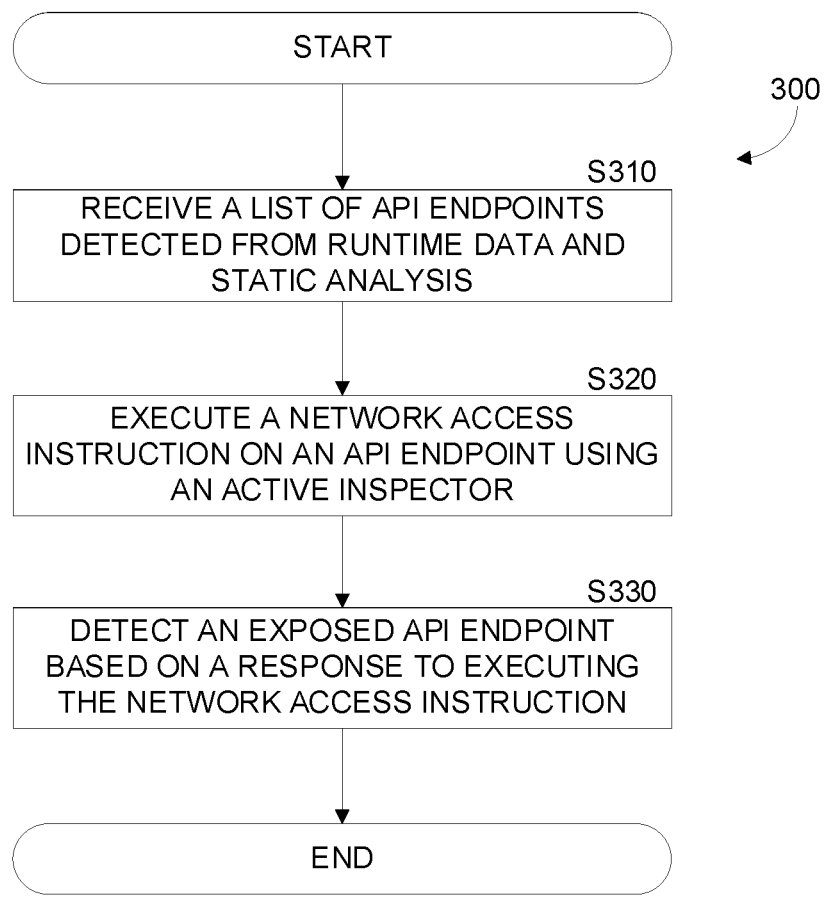
FIG. 3 is an example flowchart of a method for API endpoint verification, implemented in accordance with an embodiment.

FIG. 3 is an example flowchart 300 of a method for API endpoint verification, implemented in accordance with an embodiment. It is advantageous to utilize a network access instruction response to detect an exposed API endpoint as this provides an accurate and efficient determination of whether an API endpoint is exposed. Further, it is advantageous to detect an exposed API endpoint as this allows for the detection of potential cybersecurity threats, data breaches, vulnerabilities, a combination thereof, and the like. An exposed API endpoint is an endpoint which, according to an embodiment, allows unintended access to the application behind the API endpoint.

At S310, a list of detected API endpoints is received. In an embodiment, the list of detected API endpoints is generated based on runtime data and static analysis results of an application. In various embodiments, detecting API endpoints includes extracting API calls from runtime data detected by a sensor, runtime sensor, and the like. In an embodiment, an API path is detected from an API call of the runtime data.

In some embodiments, the detected API path is associated with an application detected from static analysis results in order to detect an API endpoint. In certain embodiments, the detected API path is compared to application configurations, API call data of an application, application functionalities, a combination thereof, and the like, to correspond the API path with an application in order to detect an API endpoint.

In various embodiments, the detected endpoints are stored in a disk, database, security database, a combination thereof, and the like. In an embodiment, the detected endpoints are collected, compiled (e.g., compiled into a list), and stored in a database, security database, disk, a combination thereof, and the like. In an embodiment, the stored API endpoints (e.g., compilation, list, group, etc.) are extracted from the disk, database, security database, a combination thereof, and the like.

At S320, a network access instruction is executed on an API endpoint. In an embodiment, an active inspector is configured to generate a network access instruction. In an embodiment, a network access instruction includes a set of parameters, protocols, rules, and the like, for triggering an API call. In various embodiments, the active inspector is configured to generate the network access instruction based on data extracted from an API call. In an embodiment, the active inspector is configured to generate a network access instruction based on network configurations, including Internet Protocol (IP) addresses, Domain Name System (DNS) settings, Virtual Private Network (VPN) configurations, a combination thereof, and the like.

In an embodiment, a network access instruction is generated based on a predetermined structure of an API call request. For example, in an embodiment, a network access instruction includes an HTTP protocol, a header, query parameters, an API key, authentication details, payload requests, a combination thereof, and the like. For example, in an embodiment a network access instruction includes an HTTP method such as "GET", "POST", "PUT", "DELETE", and the like. In an embodiment, for example, a network access instruction includes a header such as "Content-Type: application/json", which indicates that the content of the request is an application in a JSON format.

In an embodiment, an active inspector is configured to execute a network access instruction on an API endpoint. In various embodiments, a network access instruction is executed on an API endpoint to verify the API endpoint. In some embodiments, a network access instruction is executed on a network path, including at least an external network. In an embodiment an external network is external to the cloud computing environment.

In an embodiment, for example, a network access instruction is executed in a request for access to a resource in the cloud computing environment from the API. In an embodiment, a server is configured to process the network access instruction and generate a network access instruction response. For example, in an embodiment, a network access instruction response to a network instruction for accessing a specific resource is "HTTP Forbidden: Access denied", which indicates that the user does not have permission to access the network.

At S330, an exposed API endpoint is detected. In an embodiment, an exposed API endpoint is detected based on a response of the executed network access instruction. In various embodiments, an exposed API endpoint is a specific location within the API that is exposed to unauthorized parties, unauthorized users, external environments, external applications, external resources, public environments, a combination thereof, and the like.

In an embodiment, an exposed API endpoint is a cybersecurity threat, having the potential to be exploited and reveal private data, more data than necessary, etc., to unauthorized parties, external environments, external applications, public environments, a combination thereof, and the like. In some embodiments, exposed API endpoints lead to potential security vulnerabilities, cybersecurity threats, data breaches, a combination thereof, and the like.

In an embodiment, an API endpoint is determined to be exposed in response to receiving a predetermined result from execution of the network access instruction.

In various embodiments, a network access instruction response that indicates an API endpoint is exposed includes a response that returns endpoint data without requiring any sort of authentication. For example, in an embodiment, a network access instruction response of "user_identifier: user234", which provides detailed user information without requiring any authentication, indicates an exposed endpoint. In an embodiment, a network access instruction response that indicates an exposed API endpoint includes a response that shares sensitive network information.

For example, in an embodiment, a network access instruction response of "hostname:serverABC" and "ip_address: 124.33.1.1", indicates an exposed API endpoint as it shares internal network data without asking for any authorization of credentials prior to sharing.

Figure 4:
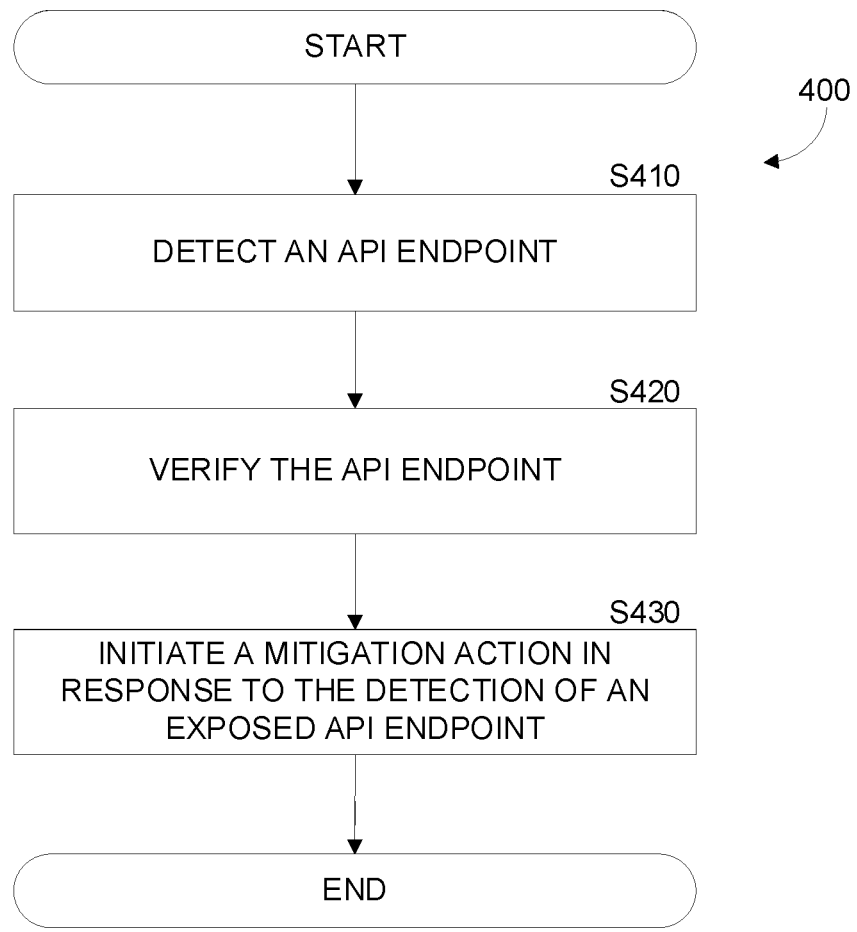
FIG. 4 is an example flowchart of a method for initiating a mitigation action in response to the detection of an exposed API endpoint, implemented in accordance with an embodiment.

FIG. 4 is an example flowchart 400 of a method for initiating a mitigation action in response to the detection of an exposed API endpoint, implemented in accordance with an embodiment. It is advantageous to execute mitigation actions on exposed API endpoints after they were determined to be exposed based on verification techniques, as this allows for the effective and accurate detection of potential cybersecurity threats, vulnerabilities, data breaches, and the like. Further, it is advantageous according to an embodiment, to execute mitigation actions on API endpoints that are determined to be exposed as this allows for effective resource allocation for the mitigation of potential threats, vulnerabilities, data breaches, and the like.

At S410, an API endpoint is detected. In an embodiment, an API endpoint is a digital location (e.g., a URL), that enables applications to interact with resources, workloads, components, and the like, of the cloud computing environment. In various embodiments, detecting an API endpoint includes extracting at least an API call from runtime data detected by a sensor, runtime sensor, and the like.

In an embodiment, the sensor is deployed on a resource, workload, and the like, in the cloud computing environment. In certain embodiments, the sensor is configured to detect runtime data from monitoring the interactions, communications, and the like, between the application and the API. In some embodiments, the sensor is configured to detect runtime data including data of API calls, API call responses, events, runtime events, a combination thereof, and the like.

In an embodiment, at least an API call is extracted from runtime data. In various embodiments, API calls are extracted based on reading data packets of the runtime data to identify API calls, API data, API responses, a combination thereof, and the like. In some embodiments, an API path is detected from the extracted API call, API call data, a combination thereof, and the like, of the runtime data.

In some embodiments, the detected API path is associated with an application detected from static analysis results in order to detect an API endpoint. In certain embodiments, the detected API path is compared to application configurations, API call data of an application, application functionalities, a combination thereof, and the like, to associate the API path with an application in order to detect an API endpoint. In an embodiment, an API path is detected based on inspection of a code object, a software image, etc.

At S420, an API endpoint is verified. In some embodiments, an API endpoint is verified in order to detect an exposed API endpoint. In an embodiment, an exposed API endpoint is an endpoint which allows unintended access to the application behind the API endpoint. In an embodiment, an exposed API endpoint is a cybersecurity threat, having the potential to be exploited and reveals private data, more than necessary data, etc., to unauthorized parties, external environments, external applications, public environments, a combination thereof, and the like.

In various embodiments, an exposed API endpoint is detected based on a result of executing a generated network access instruction on an API endpoint. In certain embodiments, a network access instruction includes a set of parameters, protocols, rules, and the like, for triggering an API call. In an embodiment, a network access instruction is a request for access to a resource in the cloud computing environment from the API. According to an embodiment, a network access instruction is executed over a network path including an external network, wherein the external network is external to the computing environment of the API endpoint (e.g., the cloud computing environment). In some embodiments, the external network is not part of the cloud computing environment.

In some embodiments, a list of the detected API endpoints is generated based on runtime data and static analysis results of an application. In an embodiment, the list of generated API endpoints is received.

In various embodiments, an active inspector is configured to generate a network access instruction based on data extracted from an API call. In an embodiment, the active inspector is configured to generate a network access instruction based on a predetermined structure of an API request. In an embodiment, the active inspector is configured to generate a network access instruction based on network configurations, including Internet Protocol (IP) addresses, Domain Name System (DNS) settings, Virtual Private Network (VPN) configurations, a combination thereof, and the like.

In various embodiments, an active inspector is configured to execute a network access instruction on a detected API endpoint, of the generated API list, in order to verify the API endpoint. In some embodiments, a server is configured to process the network access instruction and generate a network access instruction response.

In various embodiments, an API endpoint is determined to be exposed based on a network access instruction response. For example, in an embodiment, a network access instruction response that indicates that an API endpoint is exposed includes a response that returns endpoint data without requiring any sort of authentication. In certain embodiments, an API endpoint is determined to be exposed in response to receiving a predetermined result from execution of the network access instruction. In an embodiment, an API endpoint is determined to be exposed in response to receiving a result which is not a predetermined result (i.e., any result other than the predetermined result) from execution of the network access instruction.

In an embodiment, an API endpoint is determined to be unexposed (i.e., not exposed), in response to receiving a result which is not a predetermined result, receiving a result which is a predetermined result, etc.

At S430, a mitigation action is initiated. In an embodiment, the mitigation action is initiated in response to the detection of an exposed API endpoint. In some embodiments, a mitigation action includes implementing input validations, stronger authentication protocols, API rate limiting and throttling, an API gateway, a combination thereof, and the like. In an embodiment, the mitigation action of implementing an input validation for an API includes configuring a resource hosting the application, for example, to implement a schema, specifying the type, format, range of acceptable values, a combination thereof, and the like, for each API endpoint, and further configuring the resource to reject any API input that does not conform to this defined schema.

In certain embodiments, a mitigation action includes the implementation of strong authentication protocols that allow only authorized users to access the API. Some examples of strong authentication protocols, in an embodiment, include the implementation of passwords, tokens, biometric data, a combination thereof, and the like to authenticate user identity. In an embodiment, a mitigation action includes the implementation of API rate limiting which limits the amount of requests that a user, application, client, and the like, can make to the API within a predefined time period.

In various embodiments, a mitigation action includes the implementation of an API gateway which monitors the flow of API calls, API requests, API data, a combination thereof, and the like, to detect unusual patterns, a potential threat, data breach, and the like.

In some embodiments, a plurality of mitigation actions are generated, each corresponding to a different platform of the cloud computing environment. For example, in an embodiment, a cybersecurity threat related to an exposed API endpoint can be mitigated in the control plane of the computing environment, in the data plane of the computing environment, by initiating an action in the infrastructure of the environment utilizing infrastructure as a service (IaaS), by initiating an action in the platform of the environment utilizing a platform as a service (PaaS), by initiating an action in the software layer of the environment utilizing software as a service (SaaS), replacing a code object, patching a misconfiguration, revoking access to a resource, revoking access from a resource, a combination thereof, and the like.

Figure 5:
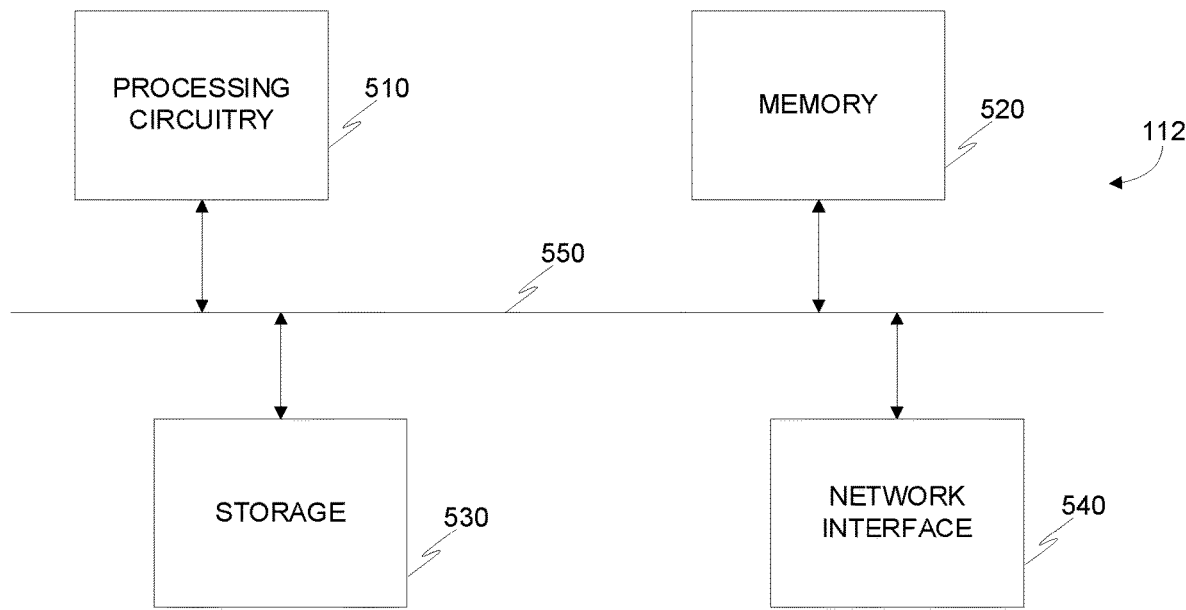
FIG. 5 is an example schematic diagram of an active inspector, according to an embodiment.

FIG. 5 is an example schematic diagram of an active inspector 112, according to an embodiment. The active inspector 112 includes a processing circuitry 510 coupled to a memory 520, a storage 530, and a network interface 540. In an embodiment, the components of the active inspector 112 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read-only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the active inspector 112 to communicate with, for example, an internet 130, an API 126, an inspector 114, a sensor backend 129, and the like.

It should be understood that the embodiments described herein are not limited to the specific architecture illustrated in FIG. 5, and other architectures may be equally used without departing from the scope of the disclosed embodiments.

Furthermore, in certain embodiments, the active inspector 112, an inspector 114, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for initiating a mitigation action for an exposed Application Programming Interface (API) endpoint in a cloud computing environment, comprising:
   detecting an API endpoint of a plurality of API endpoints in a cloud computing environment, wherein verifying the API endpoint includes generating a list of detected API endpoints based on runtime data and static analysis results of an application;
   executing a network access instruction on the API endpoint, wherein the network access instruction is provided over at least an external network;
   determining that the API endpoint is an exposed API endpoint in response to receiving a predetermined result of executing the network access instruction; and
   initiating a mitigation action in response to the detection of the exposed API endpoint.

2. The method of claim 1, further comprising:
   initiating the mitigation action in any of a plurality of platforms of the cloud computing environment.

3. The method of claim 2, wherein the plurality of platforms includes any one of: an infrastructure as a service (IaaS), a platform as a service (PaaS), a software as a service (Saas), and any combination thereof.

4. The method of claim 1, wherein initiating a mitigation action further comprises:
   initiating any one of: an input validation, an authentication protocol, an API gateway, an API input rate limit, and any combination thereof.

5. The method of claim 1, further comprising:
   determining that the API endpoint is an unexposed API endpoint in response to receiving a result of executing the network access instruction which is different than the predetermined result.

6. The method of claim 1, wherein detecting an API endpoint further comprises:
   receiving runtime data from a plurality of sensors, each sensor deployed on a workload in the cloud computing environment;
   extracting a plurality of API calls from the received runtime data; and
   detecting an API path from an extracted API call of the plurality of API calls.

7. The method of claim 6, further comprising:
   initiating inspection of a workload associated with the API path; and
   detecting an API endpoint of the plurality of API endpoints based on a result of the inspection and the detected API path.

8. The method of claim 7, further comprising:
   inspecting the workload for a cybersecurity object, wherein the cybersecurity object indicates an application associated with the API path.

9. The method of claim 8, wherein initiating inspection of a workload further comprises:
   initiating static analysis on a workload on which a sensor is deployed for a detection of an application related to the API call.

10. The method of claim 1, wherein verifying the API endpoint further comprises:
    generating the network access instruction based on data extracted from an API call.

11. A non-transitory computer-readable medium storing a set of instructions for initiating a mitigation action for an exposed Application Programming Interface (API) endpoint in a cloud computing environment, the set of instructions comprising:
    one or more instructions that, when executed by one or more processors of a device, cause the device to:
       detect an API endpoint of a plurality of API endpoints in a cloud computing environment, wherein verifying the API endpoint includes generating a list of detected API endpoints based on runtime data and static analysis results of an application;
       execute a network access instruction on the API endpoint, wherein the network access instruction is provided over at least an external network;
       determine that the API endpoint is an exposed API endpoint in response to receiving a predetermined result of executing the network access instruction; and
       initiate a mitigation action in response to the detection of the exposed API endpoint.

12. A system for initiating a mitigation action for an exposed Application Programming Interface (API) endpoint in a cloud computing environment comprising:
    a processing circuitry;
    a memory, the memory containing instructions that, when executed by the processing circuitry, configure the system to:
    detect an API endpoint of a plurality of API endpoints in a cloud computing environment by generating a list of detected API endpoints based on runtime data and static analysis results of an application;
    execute a network access instruction on the API endpoint, wherein the network access instruction is provided over at least an external network;
    determine that the API endpoint is an exposed API endpoint in response to receiving a predetermined result of executing the network access instruction; and
    initiate a mitigation action in response to the detection of the exposed API endpoint.

13. The system of claim 12, wherein the memory contains further instructions which when executed by the processing circuitry further configure the system to:
    initiate the mitigation action in any of a plurality of platforms of the cloud computing environment.

14. The system of claim 13, wherein the plurality of platforms includes any one of:
    an infrastructure as a service (IaaS), a platform as a service (PaaS), a software as a service (Saas), and any combination thereof.

15. The system of claim 12, wherein the memory contains further instructions that, when executed by the processing circuitry for initiating a mitigation action, further configure the system to:
  initiate any one of:
    an input validation, an authentication protocol, an API gateway, an API input rate limit, and any combination thereof.

16. The system of claim 12, wherein the memory contains further instructions which when executed by the processing circuitry further configure the system to:
  determine that the API endpoint is an unexposed API endpoint in response to receiving a result of executing the network access instruction which is different than the predetermined result.

17. The system of claim 12, wherein the memory contains further instructions that, when executed by the processing circuitry for detecting an API endpoint, further configure the system to:
  receive runtime data from a plurality of sensors, each sensor deployed on a workload in the cloud computing environment;
  extract a plurality of API calls from the received runtime data; and
  detect an API path from an extracted API call of the plurality of API calls.

18. The system of claim 17, wherein the memory contains further instructions which when executed by the processing circuitry further configure the system to:
  initiate inspection of a workload associated with the API path; and
  detect an API endpoint of the plurality of API endpoints based on a result of the inspection and the detected API path.

19. The system of claim 18, wherein the memory contains further instructions which when executed by the processing circuitry further configure the system to:
  inspect the workload for a cybersecurity object, wherein the cybersecurity object indicates an application associated with the API path.

20. The system of claim 19, wherein the memory contains further instructions that, when executed by the processing circuitry for initiating inspection of a workload, further configure the system to:
  initiate static analysis on a workload on which a sensor is deployed for a detection of an application related to the API call.

21. The system of claim 12, wherein the memory contains further instructions that, when executed by the processing circuitry for verifying the API endpoint, further configure the system to:
  generate the network access instruction based on data extracted from an API call.

* * * * *